(12) United States Patent
Morris et al.

(10) Patent No.: US 9,183,381 B2
(45) Date of Patent: Nov. 10, 2015

(54) APPARATUS, SYSTEM, AND METHOD FOR DETECTING TAMPERING OF FISCAL PRINTERS

(75) Inventors: Julie A. Morris, Raleigh, NC (US); James M. White, Raleigh, NC (US); Wayne R. Hucaby, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1707 days.

(21) Appl. No.: 12/209,503

(22) Filed: Sep. 12, 2008

(65) Prior Publication Data

US 2010/0071077 A1  Mar. 18, 2010

(51) Int. Cl.
*G06F 21/55* (2013.01)
*G06F 21/86* (2013.01)

(52) U.S. Cl.
CPC .............. *G06F 21/55* (2013.01); *G06F 21/86* (2013.01)

(58) Field of Classification Search
CPC ................................. G06F 21/86; G06F 21/55
USPC ................. 713/193, 194, 340; 726/34, 36
See application file for complete search history.

(56) References Cited

U.S. PATENT DOCUMENTS

| 4,312,037 | A | * | 1/1982 | Yamakita | 705/24 |
|---|---|---|---|---|---|
| 4,513,389 | A | * | 4/1985 | Devchoudhury | 711/164 |
| 4,813,912 | A | * | 3/1989 | Chickneas et al. | 705/408 |
| 5,159,629 | A | | 10/1992 | Double et al. | |
| 5,321,753 | A | * | 6/1994 | Gritton | 380/42 |
| 5,502,670 | A | | 3/1996 | Banerjee et al. | |
| 5,737,504 | A | * | 4/1998 | Yamada | 358/1.18 |
| 5,966,081 | A | * | 10/1999 | Chesnutt | 340/5.64 |
| 6,182,223 | B1 | * | 1/2001 | Rawson | 726/22 |
| 6,199,049 | B1 | | 3/2001 | Conde et al. | |
| 6,292,898 | B1 | * | 9/2001 | Sutherland | 726/34 |
| 6,323,782 | B1 | * | 11/2001 | Stephens et al. | 340/10.31 |
| 7,015,823 | B1 | * | 3/2006 | Gillen et al. | 340/652 |
| 7,200,759 | B2 | | 4/2007 | Oerlemans | |
| 7,490,250 | B2 | * | 2/2009 | Cromer et al. | 713/194 |
| 7,782,198 | B2 | * | 8/2010 | Crockett et al. | 340/541 |
| 8,228,532 | B2 | * | 7/2012 | Morris et al. | 358/1.15 |
| 8,339,632 | B2 | * | 12/2012 | Wasamoto et al. | 358/1.14 |
| 2003/0090699 | A1 | | 5/2003 | Meyerhofer et al. | |

(Continued)

OTHER PUBLICATIONS

Fink, Russell A., Alan T. Sherman, and Richard Carback. "Tpm meets DRE: reducing the trust base for electronic voting using trusted platform modules." Information Forensics and Security, IEEE Transactions on 4.4 (2009): 628-637.*

(Continued)

*Primary Examiner* — Kari Schmidt
(74) *Attorney, Agent, or Firm* — Kunzler Law Group

(57) ABSTRACT

An apparatus, system, and method are disclosed for detecting tampering of devices such as fiscal printers. A memory module includes a volatile memory that stores multi-bit data. An operation module allows operation of an electronic device, such as a fiscal printer, in response to determining that the predefined multi-bit data is stored in the volatile memory. A detection module detects an attempt to access the enclosed device where access to the enclosed device is restricted by an enclosure. A tamper switch module disconnects power to the volatile memory such that the predefined multi-bit data stored in the volatile memory is erased in response to the detection module detecting an attempted access to the enclosed device. A shutdown module disables operation of the electronic device in response to determining that the predefined multi-bit data is not stored in the volatile memory.

17 Claims, 5 Drawing Sheets

(56) References Cited

U.S. PATENT DOCUMENTS

| | | | |
|---|---|---|---|
| 2004/0117106 A1* | 6/2004 | Dudel et al. | 701/115 |
| 2004/0255141 A1* | 12/2004 | Hodder et al. | 713/200 |
| 2005/0240756 A1* | 10/2005 | Mayer | 713/2 |
| 2007/0115122 A1* | 5/2007 | McClure et al. | 340/568.1 |
| 2008/0184341 A1* | 7/2008 | Sebesta et al. | 726/4 |
| 2009/0182531 A1* | 7/2009 | Ekkizogloy et al. | 702/182 |

OTHER PUBLICATIONS

Pearson, Siani. "Taking account of privacy when designing cloud computing services." Proceedings of the 2009 ICSE Workshop on Software Engineering Challenges of Cloud Computing. IEEE Computer Society, 2009.*

1-Wire Time Chip with Interrupt, Dallas Semiconductor MAXIM, DS2417, www.maxim-ic.com.

* cited by examiner

APPARATUS, SYSTEM, AND METHOD FOR DETECTING TAMPERING OF FISCAL PRINTERS

BACKGROUND

1. Field of the Invention

This invention relates to detecting tampering of a device and more particularly relates to tamper evident devices for protecting fiscal printers and other electronic devices.

2. Description of the Related Art

In most countries, sellers of goods and services are required to collect taxes, such as sales taxes, which are later collected by governmental tax agencies. Point of Sale ("POS") systems are typically used to record transaction data using transaction recording devices. For example, a fiscal printer may be provided with the POS system to record and print sales receipts showing an amount of taxes that have been collected by a particular merchant. These records and receipts may then be used by the government tax agencies to audit merchants and ensure that the amount of taxes collected by a merchant equals the amount of taxes that are passed from the merchant to the government.

In order to ensure integrity of the tax data recorded by a fiscal printer, it is important that the data be protected from tampering. A conventional fiscal printer typically uses an existing single or double station printer platform and adds logic devices in an enclosure at the bottom of the fiscal printer in order to comply with governmental regulations. The enclosed logic devices may include devices such as an electronic journal and fiscal memory which are used to electronically store recorded tax data. Such logic devices are typically enclosed in a drawer or compartment that slides into the printer beneath the existing printer platform so as to be protected from tampering.

Some countries have specific tamper-proof requirements for fiscal printers and other transaction recording devices. Thus, conventional fiscal printers in most countries include several tamper-proof measures. For example, a screw or screws for accessing the inside of the printer may be physically sealed or the fiscal memory and electronic journal may be imbedded in epoxy to prevent access to those devices. However, such tamper proofing measures have proven insufficient, because the only way for an auditor to know if a device has been tampered with is by visual inspection of the device.

Some conventional systems, have utilized a capacitor-based tamper switch to electronically detect when a tamper occurs, but such switches have also proved insufficient. This is because a capacitor provides only a single bit of information, so it can be easily bypassed or can result in frequent false tampers being recorded. Thus, tampering remains a problem in most conventional fiscal printing systems.

BRIEF SUMMARY

From the foregoing discussion, it should be apparent that a need exists for an apparatus, system, and method that detect tampering of a transaction recording device such as a fiscal printer. Beneficially, such an apparatus, system, and method would detect and electronically record a tamper, or attempted access of a protected device, such that no visual inspection is needed to detect that a tamper has occurred.

The present invention has been developed in response to the present state of the art, and in particular, in response to the problems and needs in the art that have not yet been fully solved by currently available tamper evident devices. Accordingly, the present invention has been developed to provide an apparatus, system, and method for detecting tampering of a transaction recording device, or other tamper protected device, that overcome many or all of the above-discussed shortcomings in the art.

The apparatus to detect tampering of an enclosed device is provided with a plurality of modules configured to functionally execute the necessary steps to make evident that an attempted access to the enclosed device has occurred. These modules in the described embodiments include a memory module, an operation module, a detection module, a tamper switch module, and a shutdown module.

The memory module includes a volatile memory that stores multi-bit data. The operation module allows operation of an electronic device, such as a fiscal printer, in response to determining that the predefined multi-bit data is stored in the volatile memory. The detection module detects an attempt to access the enclosed device where access to the enclosed device is restricted by an enclosure. The tamper switch module disconnects power to the volatile memory such that the predefined multi-bit data stored in the volatile memory is erased in response to the detection module detecting an attempted access to the enclosed device. The shutdown module disables operation of the electronic device in response to determining that the predefined multi-bit data is not stored in the volatile memory. Thus, in this manner, a fiscal printer or other electronic device may be disabled if a user attempts to tamper with it.

In a further embodiment of the apparatus, the shutdown module disables printing operations of the fiscal printer in response to determining that the predefined multi-bit data is not stored in the volatile memory. Thus, a merchant may be prevented from making transactions if an attempted access or tamper is detected, and/or an administrator may be signaled that a attempted tamper has occurred.

In one embodiment, the enclosed device includes a non-volatile memory and disabling operation of the electronic device includes disabling the utilization of the non-volatile memory. The non-volatile memory typically facilitates operation of the electronic device. For example, the use of an electronic journal or fiscal memory in conjunction with a fiscal printer may be disabled. In various embodiments, the non-volatile memory may be utilized by the electronic device to store and preserve transaction data electronically.

In a further embodiment, the detection module may include a switch placed in contact with a movable surface of the enclosure such that movement of the moveable surface above a predetermined threshold causes a detection of an attempt to access the enclosed device. For example, the switch may be configured to trigger if the moveable surface is moved more than 5 millimeters. In some embodiments, the moveable surface may be a drawer or a door.

In various embodiments of the apparatus, the memory module, detection module and tamper switch module are housed within the enclosure so as to prevent tampering of the modules as well as to prevent tampering of the enclosed device. In one embodiment, the volatile memory is static random access memory ("SRAM"). In further embodiment, the volatile memory is a 1-wire, serial input/output microchip that is connected to the enclosed device. In a further embodiment, the shutdown module sends a signal to notify a user that an attempt to access the enclosed device has occurred. This is typically done in response to determining that the predefined multi-bit data is not stored in the volatile memory.

A system of the present invention is also presented to detect tampering of an enclosed device. The system may be embodied with substantially the same embodiments and modules described above with regard to the apparatus. In particular, the system, in one embodiment, includes a memory module, an operation module, a detection module, a tamper switch module, and a shutdown module.

The memory module includes a volatile memory that stores multi-bit data. The operation module allows operation of an electronic device, such as a fiscal printer, in response to determining that the predefined multi-bit data is stored in the volatile memory. The detection module detects an attempt to access the enclosed device where access to the enclosed device is restricted by an enclosure. The tamper switch module disconnects power to the volatile memory such that the predefined multi-bit data stored in the volatile memory is erased in response to the detection module detecting an attempted access to the enclosed device. The shutdown module disables operation of the electronic device in response to determining that the predefined multi-bit data is not stored in the volatile memory. Thus, in this manner, a fiscal printer or other electronic device may be disabled if a user attempts to tamper with it.

The system may further include various embodiments of the enclosed device and the electronic device. For example, in one embodiment the electronic device is a fiscal printer and the enclosed device includes some non-volatile memory for recording transaction data such as a fiscal memory or electronic journal. Preferably, the electronic device is in electronic communication with the enclosed device.

In one embodiment, the system includes a transaction processing device, such as a computer system, that is utilized to perform sales transactions, the transaction device utilizing the enclosed device to store transaction data. In a further embodiment, the transaction processing device may utilize the electronic device to print transaction data. For example a receipt might be printed and provided to a customer.

A method of the present invention is also presented for detecting tampering of an enclosed device. The method in the disclosed embodiments substantially includes the steps necessary to carry out the functions presented above with respect to the operation of the described apparatus and system. In some embodiments, the method may be implemented as a computer program product.

In one embodiment, the method includes storing predefined multi-bit data in a volatile memory and allowing operation of an electronic device in response to determining that the predefined multi-bit data is stored in the volatile memory. The method also may include detecting an attempt to access an enclosed device where access to the enclosed device is restricted by an enclosure and disconnecting power to the volatile memory such that the predefined multi-bit data stored in the volatile memory is erased in response to the detection module detecting an attempted access to the enclosed device. In a further embodiment, the method includes disabling operation of the electronic device in response to determining that the predefined multi-bit data is not stored in the volatile memory.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
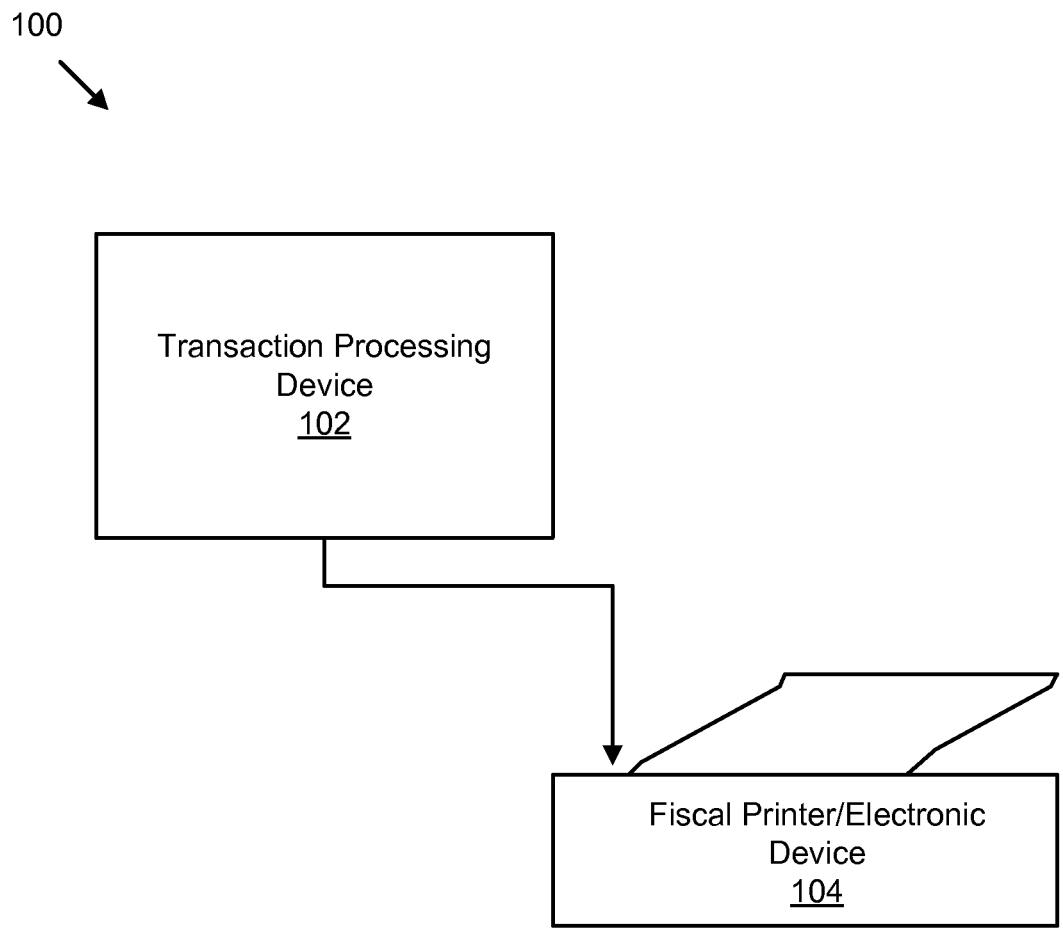
FIG. 1 is a schematic block diagram illustrating one embodiment of a system to detect tampering of an electronic device in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for detecting tampering of an electronic device in accordance with the present invention. In one embodiment, the system 100 includes a transaction processing device 102 and a fiscal printer 104. Although, this application primarily refers to the use of a transaction processing device 102, such as a computer system or computer-based cash register, in conjunction with a fiscal printer 104, it is contemplated that the present invention could be used with other like devices in which tamper detection may be needed as will be recognized by those of skill in the art.

The transaction processing device 102 is typically a device, such as a personal computer, that can be used to process sales transactions that are commonly performed in conjunction with the sale of goods and merchandise. Of course, other devices outside the realm of sales transaction processing are also contemplated such as other types of personal computers, laptops, PDAs, cell phones, and the like which may be used to record and store sensitive data at risk of being tampered with.

The transaction processing device 102 may be configured to include the equipment necessary to receive, process, and record payments from a customer in exchange for goods. For example, the transaction processing device 102 might include cash register type components such as a drawer for storing and protecting cash and/or a credit card processing machine for receiving payment via credit card. The transaction processing device 102 may include a display such as a computer monitor or LCD screen for presenting sales amounts and transaction summaries to a user or customer. In some embodiments, the transaction processing device 102 may be implemented as a personal computer ("PC") based electronic cash register or a point of sale ("POS") device as will be recognized by those of skill in the art.

In various embodiments, the transaction processing device 102 may include a keyboard or keypad for inputting transaction data and/or may include a scanner or bar code reader for entering product data. The transaction processing device 102 may also be configured to compute sales tax or other types of taxes or fees that may be collected by a merchant on behalf of a government or other agency.

Typically, the transaction processing device 102 is in electronic communication with the fiscal printer 104. In one embodiment, the fiscal printer 104 prints and records transaction and tax data. The fiscal printer 104 may be configured to provide a printed receipt to a customer as well as electronically record the transaction data in a memory for later use, such as during an audit by a government tax agency. Although the embodiments described herein primarily refer to the use of a fiscal printer 104, other types of electronic devices 104 are also contemplated which may be in need of tamper protection. For example, the present invention may be used to make evident the tampering of electronic devices 104 such as computer systems, PDAs, video game systems, memory devices, and various other electronic devices 104 as will be recognized by those of skill in the art.

Figure 2:
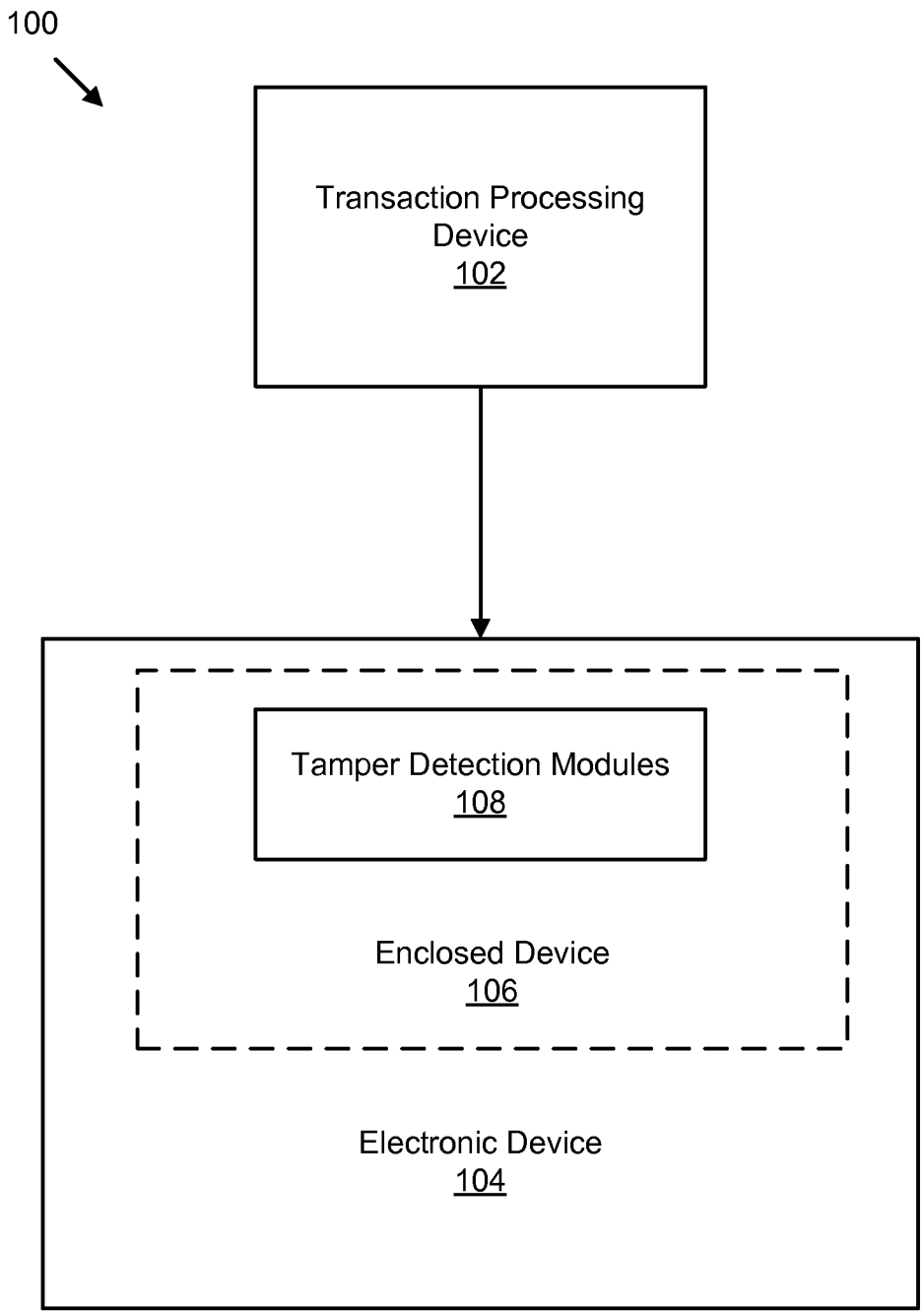
FIG. 2 is a schematic block diagram illustrating a further embodiment of a system to detect tampering of an electronic device in accordance with the present invention.

As depicted in FIG. 2, the fiscal printer 104 may include an enclosed device 106 that is preferably protected by an enclosure such that a user is prevented from accessing the enclosed device 106. In some embodiments, the enclosure may include a moveable surface such as a door or drawer for allowing selective access to the enclosed device 106. In one embodiment, the enclosed device 106 may include a fiscal memory and/or electronic journal for recording and storing specific data for each sales transaction processed using the fiscal printer 104. In a further embodiment, the enclosed device 106 is integrated within the fiscal printer 104 such that the enclosed device 106 is enclosed and protected from access within the fiscal printer 104. For example, the enclosed device 106 may be housed in a drawer or compartment in the base of the fiscal printer.

In other embodiments, the enclosed device 106 may be provided external to the fiscal printer 104, and may be configured to communicate electronically with the fiscal printer 104 via cables, buses, or other types of connections. For example, the enclosed device 106 may be housed in a separate external compartment such as a lock box, safe, or other type of protected enclosure as will be recognized by those of skill in the art. Preferably, the enclosed device 106 receives transaction data from the fiscal printer 104, or other electronic device 104, and utilizes the enclosed device 106 to store transaction data or other sensitive data in need of protection from tampering.

The enclosed device 106 preferably includes tamper detection modules 108 that perform the logic necessary to detect and record an attempted access or attempted tamper of the enclosed device 106. For example, a merchant may attempt to access the enclosed device 106 to disable, bypass, or corrupt the data stored therein in order to avoid paying taxes or other fees to a government agency. Thus, the tamper detection modules 108, as described in detail below, make evident that such an attempted access has occurred and may prevent operation of the fiscal printer 104 and/or enclosed device 106 until the devices have been inspected by an administrator or other investigator. Of course, the tamper detection modules 108 described herein may be used in conjunction with other types of tamper prevention and tamper evident devices as will be recognized by those of skill in the art.

Figure 3:
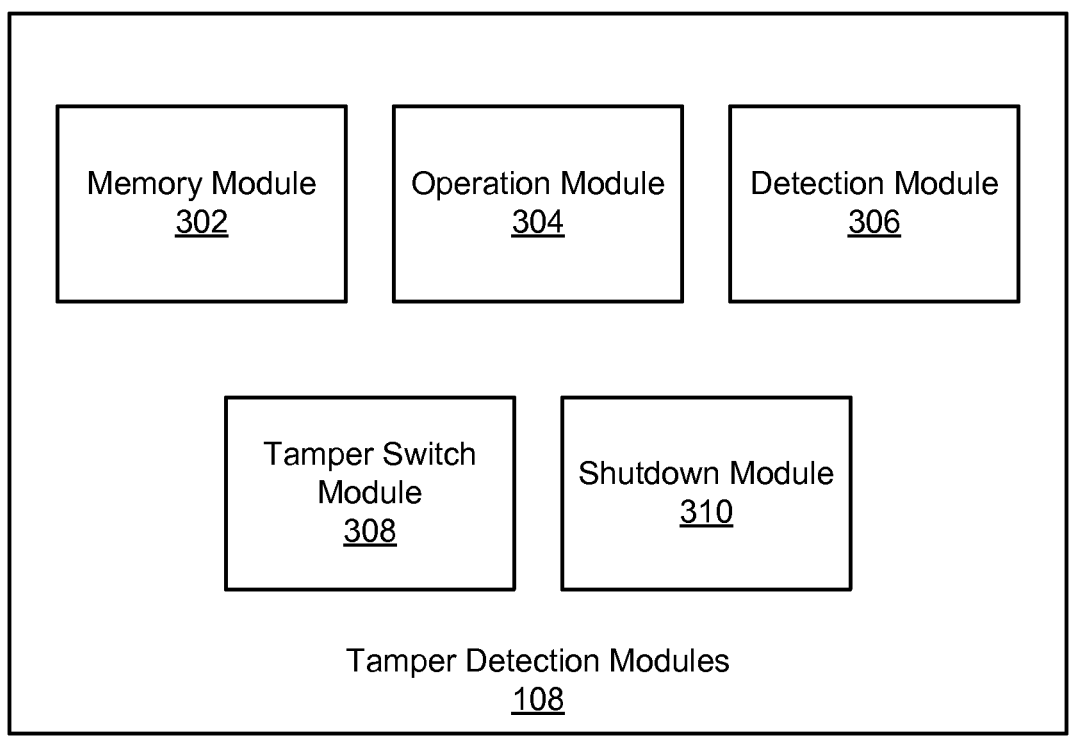
FIG. 3 is a schematic block diagram illustrating one embodiment of tamper detection modules utilized to detect tampering of an electronic device in accordance with the present invention.

FIG. 3 is a schematic block diagram depicting one embodiment of the tamper detection modules 108. In one embodiment, the tamper detection modules 108 may include a memory module 302, an operation module 304, a detection module 306, a tamper switch module 308, and a shutdown module 310.

Preferably, the memory module 302 comprises a volatile memory that can be used to store a code or pattern of predefined multi-bit data. Volatile memory as used herein is memory that maintains storage of data so long as the volatile memory is receiving power from a power source such as a power supply or battery. If power is lost, the data stored in the volatile memory is typically lost or corrupted. Dynamic random access memory ("DRAM") and static random access memory ("SRAM") are common examples of volatile memory as will be recognized by those of skill in the art. In at least one embodiment, the volatile memory may be provided as a 1-wire, serial input/output microchip that is connected to the enclosed device 106. The 1-wire, serial input/output functionality may be used to program the chip with the multi-bit data and to allow communication with the volatile memory to determine if the multi-bit data is, in fact, stored therein. An example of one such chip is the DS2417 1-Wire Time chip with Interrupt from Maxim Integrated Products, Inc. of Sunnyvale, Calif.

In accordance with the present invention, the memory module 302 may be programmed or re-programmed by an administrator to store the multi-bit data in the volatile memory. For example, the volatile memory may have stored therein a particular pattern or code that can be checked to read to determine that power has not been disconnected to the volatile memory. Because the multi-bit data pattern is more complex than a single capacitor or simple bit, it will typically be more difficult for a user to bypass the memory module in an attempt to access the enclosed device.

Preferably, the fiscal printer 104 and/or enclosed device 106 may only be operable in response to determining that the multi-bit data code is stored in the volatile memory. For example, the fiscal printer 104 and the enclosed device 106 may be configured to check whether the volatile memory contains the multi-bit data before the devices can be operated. If the multi-bit data is not stored in the volatile memory then the devices may be disabled as will be described below and an attempted access will be evident.

In one embodiment, the operation module 304 allows operation of the fiscal printer 104 in response to determining that the predefined multi-bit data is stored in the volatile memory. For example, the operation module 304 may check the volatile memory to determine whether the multi-bit data is stored therein. If the correct multi-bit data pattern is found in the volatile memory, then the operation module 304 may generate a signal indicating that the fiscal printer 104 or electronic device 104 may continue operation. For example, if the electronic device 104 is a fiscal printer 104, the merchant will be allowed to continue printing receipts and processing transactions, and data will continue to be recorded in the non-volatile memory of the enclosed device 106.

In some embodiments, the volatile memory in the memory module 302 may be checked for the multi-bit data upon each startup of the enclosed device 106 and/or electronic device 104. In other embodiments, the volatile memory may be checked for the multi-bit data after each transaction, periodically based on activity or time increments, in response to particular actions, or in response to various other inputs as will be recognized by those of skill in the art.

The detection module 306 detects an attempt to access the enclosed device 106 where access to the enclosed device 106 is restricted by an enclosure. For example, if the enclosure housing the enclosed device 106 includes a drawer or door, then the unauthorized opening of the drawer or door will cause the detection module 306 to detect that an attempted access, or tamper, of the enclosed device 106 has occurred. In one embodiment, the detection module 306 may include a switch placed in contact with a moveable surface of the enclosure such that movement of the moveable surface above a predetermined threshold causes a detection of an attempt to access the enclosed device 106. For example, a switch may be configured such that the switch is triggered if a door or drawer of the enclosure is opened or moved more than some predefined threshold, such as 5 millimeters.

As will be recognized by those of skill in the art, numerous types of mechanical and electrical switches may be utilized to detect movement of a door or surface. For example, electrical contacts may be used on the enclosure such that a circuit is completed only when a door of the enclosure is closed. In another embodiment, an electromechanical switch may be used such that movement of a mechanical arm causes the switch to open or close. An example of one such switch is a Honeywell Micro Switch from Honeywell Sensing and Control of Golden Valley, Minn. In various embodiments, the switch may be configured to respond to a predefined threshold of movement such that an attempted access of the enclosed device 106 will result in the switch being triggered.

Other types of detection devices are also contemplated in accordance with the present invention such as vibration or impact sensitive switches to detect if there is an attempt to penetrate the enclosure that houses the enclosed device 106. For example, if a saw or drill is used to attempt to cut into the enclosure, the detection module 306 may be configured to detect vibrations or penetrations of the enclosure. Those of skill in the art will recognize that there are numerous ways to detect an attempted access to an enclosure in accordance with the present invention.

The tamper switch module 308 disconnects power to the volatile memory in the memory module 302 in response to the detection module 306 detecting an attempted access to the enclosed device 106. By disconnecting power to the volatile memory, the multi-bit data stored in the volatile memory is erased. For example, if the detection module 306 is utilizing an electromechanical switch to detect an attempted access, then if the switch is triggered, the closing or opening of the switch may directly disconnect power to the volatile memory. In other embodiments, the switch or other types of detection devices may be used to provide a signal to additional circuitry or switches that may, in turn, disconnect power to the volatile memory. In a preferred embodiment, the tamper switch module 308 may include a single pole double throw (SPDT) type switch. Such a switch may be configured such that a voltage lead that provides power to the volatile memory is switched directly to ground via the single pole double throw switch in response to an attempted access to the enclosed device 106. By switching the voltage lead directly to ground, the multi-bit data in the volatile memory may be erased very quickly and efficiently.

Figure 4:
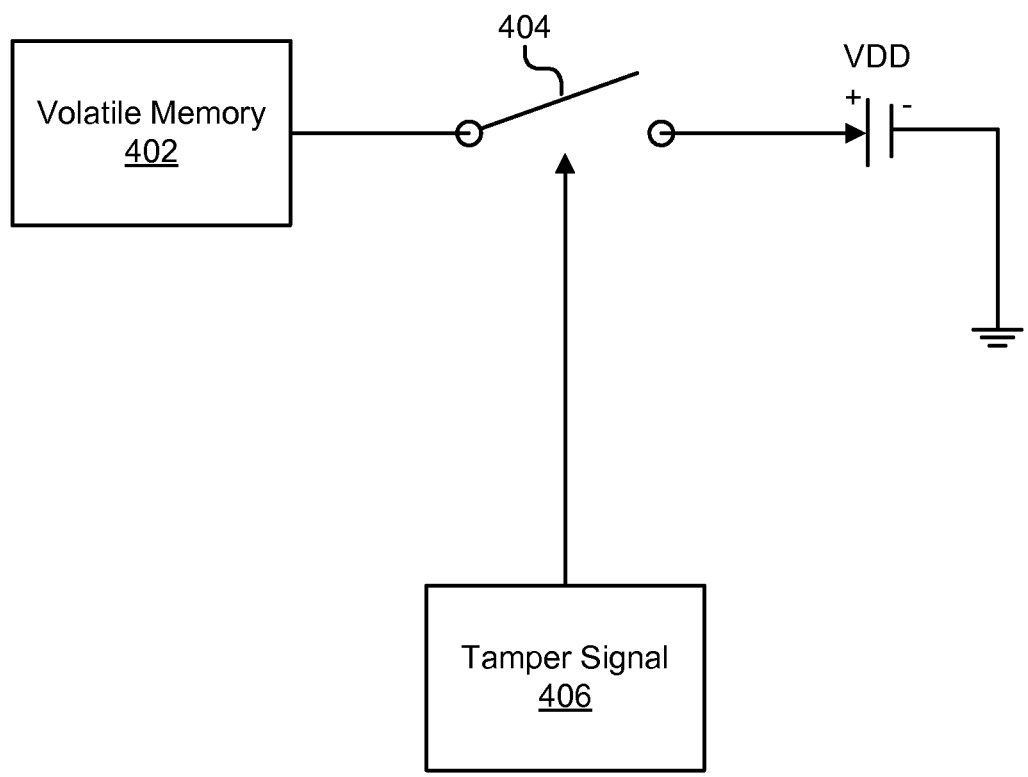
FIG. 4 is a schematic block diagram illustrating one embodiment of a system to detect tampering of an electronic device in accordance with the present invention.

In some embodiments, power may be provided to the volatile memory by a battery or standby power during a shutdown of the main power supply that typically provides power to the volatile memory. In such embodiments, the tamper switch module 308 is preferably configured to disconnect the volatile memory power from all batteries and other types of standby power such that the multi-bit data stored in the volatile memory is lost or erased. As depicted in FIG. 4, a volatile memory 402 may be connected to a power source VDD via a switch 404. Typically, the switch 404 is closed, thereby allowing power to flow to the volatile memory 402 in order to maintain storage of the multi-bit data stored in the volatile memory 402. If a tamper signal 406 is received from the detection module 306, the tamper signal 406 may cause the switch to open thereby disconnecting the power source VDD from the volatile memory 402. The loss of power to the volatile memory 402 will cause the multi-bit data to be lost, thereby indicating that an attempted tamper has occurred.

In one embodiment, the tamper switch module 308 may send a signal to the volatile memory 402, such as a reset signal, that causes the multi-bit data in the volatile memory to be erased or lost. In a further embodiment, the memory 402 may be a non-volatile memory that is configured to store the multi-bit data therein. In such an embodiment, the tamper switch module 308 may send a signal to the non-volatile memory that causes the multi-bit data to be erased from the non-volatile memory.

The shutdown module 310 disables operation of the fiscal printer 104 in response to the determining that the predefined multi-bit data is not stored in the volatile memory. Similar to the operation module 304, the shutdown module 310 may communicate with the volatile memory to determine whether the multi-bit data is stored therein. However, if the correct multi-bit data pattern is not found in the volatile memory, then the shutdown module 310 may generate a signal that disables operation of the fiscal printer 104 or electronic device 104. For example, if the electronic device 104 is a fiscal printer 104, the merchant will not be allowed to continue printing receipts and processing transactions, and data may no longer be recorded in the non-volatile memory of the enclosed device 106 which may include a fiscal memory and/or an electronic journal. In this way, it is made evident that an attempted access of the enclosed device 106 has occurred, and attention from an administrator may be needed before the fiscal printer 104 may be operated again.

In one embodiment, the shutdown module 310 may send a signal to notify a user that an attempt to access the enclosed device 106 has occurred. For example, a message might be sent remotely to a monitoring agency or administrator, and/or a message may be presented to the local user indicating that the fiscal printer 104 has been disabled and that attention from an administrator is needed. Typically, operation of the fiscal printer 104 and/or enclosed device 106 may only resume after the multi-bit data is stored back into the volatile memory of the memory module 302. For example, once it has become evident that an attempted tamper has occurred, an administrator may examine the fiscal printer 104 and enclosed device 106 to determine what caused the detection of the attempted tamper. Preferably, the administrator may then reprogram the volatile memory to store the multi-bit data necessary for operation of the fiscal printer 104.

In some embodiments, the volatile memory in the memory module 302 may be checked for the multi-bit data upon each startup of the enclosed device 106 and/or fiscal printer 104. In other embodiments, the volatile memory may be checked for the multi-bit data after each transaction, periodically based on activity or time increments, in response to particular actions, or in response to various other inputs as will be recognized by those of skill in the art.

Figure 5:
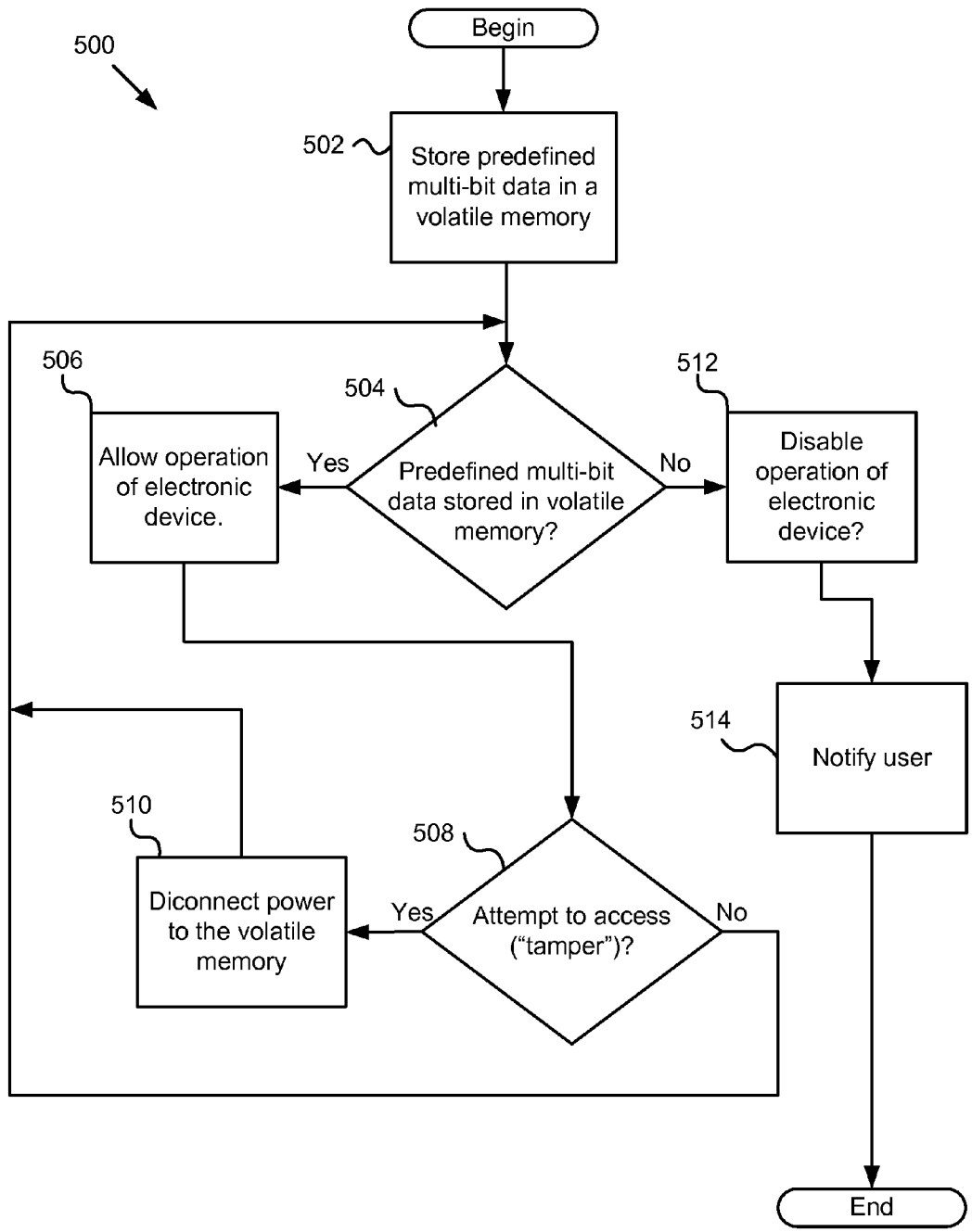
FIG. 5 is a schematic flow chart diagram illustrating one embodiment of a method for detecting tampering of an electronic device in accordance with the present invention.

FIG. 5 illustrates one embodiment of a method 500 for detecting tampering of an enclosed device 106. The depicted method substantially includes the modules 108 and logic described above with regard to FIGS. 1-4. The method 500 begins by storing 502 predefined multi-bit data in a volatile memory. Typically, the volatile memory is in electronic communication with an electronic device 104 such that the electronic device 104 may determine 504 whether or not the multi-bit data is, in fact, stored in the volatile memory.

If the correct predefined multi-bit data is stored in the volatile memory, then a tamper has not occurred and the operation module 204 allows 506 normal operation of the electronic device 104. For example, upon startup of a fiscal printer 104, the operation module 204 may determine that the proper multi-bit data is stored in the volatile memory and therefore allow operation of the fiscal printer 104 such that the printing and recording of transactional data may occur.

Next, the detection module 306 detects 508 whether an attempt to access the enclosed device 106 has occurred. For example, the detection module 306 may detect whether an access door to an enclosure housing the enclosed device 106 has been opened. If the detection module 306 detects that an attempted access of the enclosed device 106 has occurred, then the tamper switch module 308 disconnects 510 power to the volatile memory such that the multi-bit data is erased from the volatile memory.

Next, the method 500 returns to determine 504 whether the predefined multi-bit data is stored in the volatile memory. If a tamper was detected by the detection module 306, then the multi-bit data will have been erased and the multi-bit data will not be found in the volatile memory. If the multi-bit data is no longer stored in the volatile memory, the shutdown module 310 disables 512 operation of the electronic device 104 and notifies 514 a user or administrator that an attempted tamper has occurred. The method 500 ends. In this manner, attempts to tamper with the enclosed device 106 are made evident to a user and/or administrator and prevents continued used of the electronic device until the multi-bit data is restored to the volatile memory.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a memory module comprising a volatile memory, the volatile memory storing a code therein, the code comprising predefined multi-bit data, the volatile memory comprising a serial input/output microchip and the predefined multi-bit data is stored in the volatile memory serially, the code stored in a particular location in the volatile memory;

an operation module that allows operation of a fiscal printer in response to determining that the code is stored in the particular location within the volatile memory;

a detection module that detects an attempt to access an enclosed device, access to the enclosed device restricted by an enclosure, the enclosed device in electronic communication with the fiscal printer;

a tamper switch module that disconnects power to the volatile memory in response to the detection module detecting an attempted access to the enclosed device, the code stored in the volatile memory is erased in response to disconnecting power to the volatile memory; and a shutdown module that disables printing operations of the fiscal printer and sends a signal to notify a user that an attempt to access has occurred in response to determining that the code is not stored in the particular location in the volatile memory, wherein the shutdown module disables printing operations of the fiscal printer in response to determining that the code is not stored in the volatile memory, wherein said modules comprise one or more of hardware circuits, programmable hardware devices and software, the software stored on one or more non-transitory, computer readable storage devices, wherein when said modules comprise software, the apparatus comprises a hardware processor.

2. The apparatus of claim 1, wherein the fiscal printer is a transaction recording device.

3. The apparatus of claim 1, wherein the enclosed device comprises a non-volatile memory, and wherein disabling operation of the fiscal printer comprises disabling the utilization of the non-volatile memory, the non-volatile memory facilitating operation of the fiscal printer.

4. The apparatus of claim 3, wherein the non-volatile memory comprises one of an electronic journal and a fiscal memory, the non-volatile memory utilized by the fiscal printer to store transaction data.

5. The apparatus of claim 1, wherein the detection module comprises a switch placed in contact with a moveable surface of the enclosure, movement of the moveable surface above a predetermined threshold causes a detection of an attempt to access the enclosed device by actuating the switch.

6. The apparatus of claim 5, wherein the moveable surface is one of a drawer and a door.

7. The apparatus of claim 1, wherein the memory module, detection module and tamper switch module are housed within the enclosure.

8. The apparatus of claim 1, wherein the volatile memory is static random access memory ("SRAM").

9. The apparatus of claim 1, wherein the volatile memory is a 1-wire, serial input/output microchip connected to the enclosed device.

10. The apparatus of claim 1, wherein the enclosed device is within the fiscal printer.

11. A system comprising:
an enclosed device, access to the enclosed device restricted by an enclosure;
an electronic device in electronic communication with the enclosed device, the enclosed device comprising a fiscal printer;
a memory module comprising a volatile memory, the volatile memory storing a code therein, the code comprising predefined multi-bit data, the volatile memory comprising a serial input/output microchip and the predefined multi-bit data is stored in the volatile memory serially, the code stored in a particular location in the volatile memory;

an operation module that allows operation of an electronic device in response to determining that the code is stored in the particular location within the volatile memory;

a detection module that detects an attempt to access the enclosed device;

a tamper switch module that disconnects power to the volatile memory in response to the detection module detecting an attempted access to the enclosed device, the code stored in the volatile memory is erased in response to disconnecting power to the volatile memory; and a shutdown module that disables printing operations of the electronic device and sends a signal to notify a user that an attempt to access has occurred in response to determining that the code is not stored in the particular location in the volatile memory, wherein said modules comprise one or more of hardware circuits, programmable hardware devices and software, the software stored on one or more non-transitory, computer readable storage devices, wherein when said modules comprise software, the apparatus comprises a hardware processor.

12. The system of claim 11, further comprising a transaction processing device that is utilized to perform sales transactions, the transaction processing device utilizing the enclosed device to store transaction data.

13. The system of claim 12, wherein the transaction processing device is a computer system.

14. A computer program product for detecting tampering of an enclosed device, said computer program product comprising a non-transitory computer readable storage medium having stored thereon program instructions executable by a processor for:

storing a code in a volatile memory, the code comprising predefined multi-bit data, the volatile memory comprising a serial input/output microchip and the predefined multi-bit data is stored in the volatile memory serially, the code stored in a particular location in the volatile memory;

allowing operation of an electronic device in response to determining that the code is stored in the particular location in the volatile memory, the electronic device comprising a fiscal printer;

detecting an attempt to access an enclosed device, access to the enclosed device restricted by an enclosure, the enclosed device in electronic communication with the electronic device;

disconnecting power to the volatile memory in response to the detection module detecting an attempted access to the enclosed device, the code stored in the volatile memory is erased in response to disconnecting power to the volatile memory;

disabling printing operations of the electronic device in response to determining that the code is not stored in the particular location in the volatile memory; and sending a signal to notify a user that an attempt to access has occurred in response to determining that the code is not stored in the particular location in the volatile memory.

15. The computer program product of claim 14, wherein the electronic device is a transaction recording device.

16. A method comprising:
storing a code in a volatile memory, the code comprising predefined multi-bit data, the volatile memory comprising a serial input/output microchip and the predefined multi-bit data is stored in the volatile memory serially, the code stored in a particular location in the volatile memory;

allowing operation of an electronic device in response to determining that the code is stored in the particular location in the volatile memory, the electronic device comprising a fiscal printer;

detecting an attempt to access an enclosed device, access to the fiscal printer restricted by an enclosure;

disconnecting power to the volatile memory in response to the detection module detecting an attempted access to the fiscal printer, the code stored in the volatile memory is erased in response to disconnecting power to the volatile memory;

disabling printing operations of the fiscal printer in response to determining that the code is not stored in the particular location in the volatile memory; and sending a signal to notify a user that an attempt to access has occurred in response to determining that the code is not stored in the particular location in the volatile memory.

17. The method of claim 16, further comprising sending a signal to notify a user that an attempt to access has occurred in response to determining that the code is not stored in the volatile memory.

* * * * *